(12) United States Patent
Lugo et al.

(10) Patent No.: US 9,090,496 B2
(45) Date of Patent: Jul. 28, 2015

(54) METHODS AND SYSTEMS FOR PROCESSING ORGANIC MATERIAL

(75) Inventors: Jose Lugo, Kirkland, WA (US); Larry LeSueur, Sammamish, WA (US)

(73) Assignee: WISERG CORPORATION, Redmond, WA (US)

( * ) Notice: Subject to any disclaimer, the term of this patent is extended or adjusted under 35 U.S.C. 154(b) by 570 days.

(21) Appl. No.: 13/191,251

(22) Filed: Jul. 26, 2011

(65) Prior Publication Data

US 2012/0024781 A1    Feb. 2, 2012

Related U.S. Application Data

(60) Provisional application No. 61/400,433, filed on Jul. 27, 2010.

(51) Int. Cl.
C02F 11/04 (2006.01)
C05F 7/00 (2006.01)
(Continued)

(52) U.S. Cl.
CPC . *C02F 11/04* (2013.01); *C05F 7/00* (2013.01); *C02F 11/121* (2013.01); *C02F 2103/06* (2013.01); *C02F 2209/005* (2013.01); *C02F 2209/02* (2013.01); *C02F 2209/06* (2013.01);
(Continued)

(58) Field of Classification Search
CPC .............. C02F 3/23; C02F 9/00; C02F 11/02; C02F 11/04; C02F 2103/32; C02F 2209/02; C02F 2209/40; C02F 2209/06; C02F 2209/005; C02F 2103/06; C02F 11/121; C05F 7/00; Y02E 50/343

USPC .......... 210/143, 149, 173, 175, 252, 259, 603
See application file for complete search history.

(56) References Cited

U.S. PATENT DOCUMENTS

| 1,597,724 | A | 8/1926 | Cooke |
| 2,043,265 | A | 6/1936 | Roeder |

(Continued)

FOREIGN PATENT DOCUMENTS

| JP | 6-233991 A | * 8/1994 |
| JP | 2002-272491 | 9/2002 |

(Continued)

OTHER PUBLICATIONS

Ataei, M. *Irredundant Cover and Semisimplity Condition*. World Academy of Science, Engineering and Technology, 2011, vol. 60, pp. 804-805.

(Continued)

*Primary Examiner* — Fred Prince
(74) *Attorney, Agent, or Firm* — Knobbe Martens Olson & Bear, LLP

(57) ABSTRACT

The present application relates to systems and methods for processing organic materials. The method may, for example, yield nutrient-rich materials that may have various agricultural uses. The method can include, in some embodiments, forming a slurry from components comprising liquid and organic material; combining the slurry with microorganisms to form a biomass; anaerobically digesting the organic material in the biomass; and at least partially separating liquid components from the digested biomass. In some embodiments, the anaerobic digestion produces low amounts of methane. The systems may, in some embodiments, be configured to perform the method of processing organic materials.

14 Claims, 3 Drawing Sheets

(51) Int. Cl.
*C02F 11/12* (2006.01)
*C02F 103/06* (2006.01)

(52) U.S. Cl.
CPC ........... *C02F 2209/40* (2013.01); *Y02E 50/343* (2013.01)

(56) References Cited

U.S. PATENT DOCUMENTS

| | | | |
|---|---|---|---|
| 2,146,692 A | 2/1939 | Tiedman | |
| 2,178,818 A | 11/1939 | Earp-Thomas et al. | |
| 2,209,613 A | 7/1940 | Roeder | |
| 2,285,834 A | 6/1942 | Proctor | |
| 2,474,833 A | 7/1949 | Eweson | |
| 3,014,896 A | 12/1961 | Colwell et al. | |
| 3,025,151 A | 3/1962 | Berg | |
| 3,462,275 A | 8/1969 | Bellamy | |
| 3,711,392 A | 1/1973 | Metzger | |
| 3,803,806 A * | 4/1974 | Komline, Sr. | 95/205 |
| 3,864,247 A | 2/1975 | Fuchs | |
| 3,933,628 A | 1/1976 | Varani | |
| 3,981,800 A | 9/1976 | Ort | |
| 3,994,780 A | 11/1976 | Klass et al. | |
| 4,022,665 A | 5/1977 | Ghosh et al. | |
| 4,025,394 A | 5/1977 | Young | |
| 4,040,953 A | 8/1977 | Ort | |
| 4,137,158 A | 1/1979 | Ishida et al. | |
| 4,179,220 A | 12/1979 | Rippon | |
| 4,193,786 A | 3/1980 | Brill | |
| 4,204,959 A | 5/1980 | Kreuzburg et al. | |
| 4,213,857 A | 7/1980 | Ishida et al. | |
| 4,233,155 A | 11/1980 | Hawkes et al. | |
| 4,248,972 A | 2/1981 | Fischer et al. | |
| 4,252,901 A | 2/1981 | Fischer et al. | |
| 4,314,904 A | 2/1982 | Fredde et al. | |
| 4,316,961 A | 2/1982 | Klass et al. | |
| 4,318,993 A | 3/1982 | Ghosh et al. | |
| 4,329,428 A | 5/1982 | Ghosh et al. | |
| 4,354,936 A | 10/1982 | Ishida et al. | |
| 4,400,195 A | 8/1983 | Rijkens | |
| 4,424,064 A | 1/1984 | Klass et al. | |
| 4,429,043 A | 1/1984 | Paton | |
| 4,442,006 A | 4/1984 | Ishida et al. | |
| 4,491,522 A | 1/1985 | Ishida et al. | |
| 4,503,154 A | 3/1985 | Paton | |
| 4,510,243 A | 4/1985 | Haga et al. | |
| 4,529,701 A | 7/1985 | Seely | |
| 4,620,928 A | 11/1986 | Gott | |
| 4,684,468 A | 8/1987 | DeBaere | |
| 4,696,746 A | 9/1987 | Ghosh et al. | |
| 4,722,741 A | 2/1988 | Hayes et al. | |
| 4,726,899 A | 2/1988 | Stafford et al. | |
| 4,735,724 A | 4/1988 | Chynoweth et al. | |
| 4,743,287 A | 5/1988 | Robinson | |
| 4,765,900 A | 8/1988 | Schwoyer et al. | |
| 4,795,711 A | 1/1989 | Nockemann | |
| 4,846,975 A | 7/1989 | Kelyman | |
| 4,885,094 A | 12/1989 | Srinivasan et al. | |
| 4,897,195 A | 1/1990 | Erikson | |
| 4,919,813 A | 4/1990 | Weaver | |
| 4,975,106 A | 12/1990 | Ferguson | |
| 4,981,592 A | 1/1991 | Garbutt et al. | |
| 4,985,149 A | 1/1991 | Ohshima et al. | |
| 5,015,384 A | 5/1991 | Burke | |
| 5,019,265 A | 5/1991 | Herve | |
| 5,290,450 A | 3/1994 | Kobayashi | |
| 5,377,917 A | 1/1995 | Wiljan et al. | |
| 5,409,610 A | 4/1995 | Clark | |
| 5,451,319 A | 9/1995 | Kobayashi | |
| 5,482,630 A * | 1/1996 | Lee et al. | 210/605 |
| 5,500,123 A | 3/1996 | Srivastava | |
| 5,525,229 A | 6/1996 | Shih | |
| 5,591,342 A | 1/1997 | Delporte et al. | |
| 5,630,942 A | 5/1997 | Steiner | |
| 5,651,890 A | 7/1997 | Trost | |
| 5,656,059 A | 8/1997 | Monster et al. | |
| 5,723,048 A | 3/1998 | Kobayashi et al. | |
| 5,798,043 A | 8/1998 | Khudenko | |
| 6,019,900 A | 2/2000 | Brink et al. | |
| 6,291,232 B1 | 9/2001 | Miller, III | |
| 6,409,788 B1 | 6/2002 | Sower | |
| 6,444,126 B1 * | 9/2002 | Gates et al. | 210/612 |
| 6,447,681 B1 | 9/2002 | Carlberg et al. | |
| 6,632,362 B2 | 10/2003 | Miller, III | |
| 6,682,578 B2 | 1/2004 | Sower | |
| 6,790,359 B2 | 9/2004 | Wilkie | |
| 6,811,701 B2 | 11/2004 | Wilkie | |
| 6,846,343 B2 | 1/2005 | Sower | |
| 6,866,779 B1 | 3/2005 | Burke | |
| 6,893,572 B2 | 5/2005 | Burke | |
| 6,942,798 B2 | 9/2005 | Miller, III | |
| 7,153,428 B2 | 12/2006 | Chynoweth et al. | |
| 7,297,274 B2 | 11/2007 | Wilkie | |
| 7,402,247 B2 | 7/2008 | Sutton | |
| 7,410,583 B2 | 8/2008 | Gray et al. | |
| 7,416,669 B1 * | 8/2008 | Carolan et al. | 210/614 |
| 7,442,224 B2 | 10/2008 | Porubcan | |
| 7,452,466 B2 | 11/2008 | Binning et al. | |
| 7,540,961 B2 | 6/2009 | Hansen et al. | |
| 7,641,796 B2 | 1/2010 | Stroot et al. | |
| 7,708,885 B2 | 5/2010 | Lanting et al. | |
| 7,806,957 B1 | 10/2010 | Burke | |
| 8,221,626 B2 * | 7/2012 | Sassow | 210/603 |
| 2003/0141244 A1 | 7/2003 | Hansen et al. | |
| 2004/0025715 A1 | 2/2004 | Bonde et al. | |
| 2005/0113611 A1 | 5/2005 | Adams et al. | |
| 2005/0252855 A1 | 11/2005 | Shieh et al. | |
| 2007/0289922 A1 * | 12/2007 | Ladron de Guevara et al. | 210/605 |
| 2009/0282882 A1 | 11/2009 | Verhave et al. | |

FOREIGN PATENT DOCUMENTS

KR 20100040076 4/2010
WO WO 2009/119961 A1 * 10/2009

OTHER PUBLICATIONS

Sreethawong, T. et al., *Hydrogen Production from Glucose-Containing Wastewater Using an Anaerobic Sequencing Batch Reactor: Effects of COD Loading Rate, Nitrogen Content, and Organic Acid Composition*. Chemical Engineering Journal, May. 2010, vol. 160, pp. 322-332.

International Search Report and Written Opinion for International Application No. PCT/US2011/045401 mailed Oct. 25, 2011.

* cited by examiner

METHODS AND SYSTEMS FOR PROCESSING ORGANIC MATERIAL

CROSS-REFERENCE TO RELATED APPLICATIONS

This application claims the benefit of priority to U.S. Application No. 61/400,433, filed Jul. 27, 2010. The contents of this application are hereby incorporated by reference in their entirety.

BACKGROUND

1. Field

The present application relates to processing organic material to obtain nutrient-rich components.

2. Description

Anaerobic digestion is a biological process in which microorganisms break down a material in the absence (or limited amounts) of oxygen. Although this may take place naturally within a landfill, the term normally describes an artificially accelerated operation. Anaerobic digestion can be used for processing various waste materials, such as sewage.

Anaerobic digestion can yield components including biogas, digestate, and wastewater. Biogas is generated by the microorganisms digesting the material and may include methane, carbon dioxide, water, and other gases. This biogas, and in particular methane, has been used as an alternative energy source. The digestate can be the remaining solids after the digestion process and may be used as compost. Wastewater may be disposed within a lagoon, wetlands, irrigation projects, or other appropriate locations.

SUMMARY

Some embodiments disclosed herein include method for processing organic material comprising: forming a slurry from components comprising liquid and organic material; combining the slurry with microorganisms to form a biomass; anaerobically digesting the organic material in the biomass; and at least partially separating liquid components from the digested biomass. In some embodiments, no more than about 0.02 $m^3$ of methane per kilogram of organic material is produced during said method.

In some embodiments, the liquid comprises water, leachate, or a combination thereof.

In some embodiments, the biomass is maintained at a pH in the range of about 3.5 to about 8 during the anaerobic digestion.

In some embodiments, the microorganisms are mesophilic microorganisms. In some embodiments, the microorganisms are thermophilic microorganisms.

In some embodiments, the biomass is maintained at a temperature in a range of about 77° F. to about 105° F. during the anaerobic digestion. In some embodiments, the biomass is maintained at a temperature in a range of about 120° F. to about 135° F. during the anaerobic digestion.

In some embodiments, the organic materials in the slurry have an average particle size of no more than about 10 cm. In some embodiments, the slurry comprises about 40 to about 100% by weight of organic material relative to a weight of liquid in the slurry.

In some embodiments, an average time period for anaerobically digesting the organic materials is in a range of about 1 day to about 14 days.

In some embodiments, the microorganisms comprise hydrolytic bacteria, acidogenic bacteria, and acetogenic bacteria.

In some embodiments, the separated liquid components comprise at least about 0.1% nitrogen by weight.

In some embodiments, the method includes receiving the liquid components into a liquid reservoir and maintaining the liquid components in the reservoir at a temperature of no more than about 70° F.

In some embodiments, said method is performed in a closed system.

In some embodiments, the method includes filtering at least a portion of volatile organic compounds, hydrogen sulfide, or volatile fatty acids produced while anaerobically digesting the organic material. In some embodiments, the volatile fatty acids comprise acetic acid, propionic acid, or butyric acid.

Some embodiments disclosed herein include a system for processing organic materials comprising: a comminution device fluidly coupled to a biology reservoir; a first heat exchanger thermally coupled to the biology reservoir; a dewatering device fluidly coupled to the biology reservoir, wherein the dewatering device is configured to at least partially separate liquid components from a composition received from the biology reservoir; a solids reservoir fluidly coupled to the dewatering device and configured to receive solid components from the dewatering device; a liquid reservoir fluidly coupled to the dewatering device and configured to receive liquid components from the dewatering device, wherein the liquid reservoir is fluidly coupled to the biology reservoir and configured to return liquid components to the biology reservoir; and a housing having a closed interior portion, wherein the closed interior portion comprises at least the biology reservoir, the solids reservoir and the liquid reservoir.

In some embodiments, the system includes a weighing device configured to weigh an amount of organic material provided to the biology reservoir.

In some embodiments, the system includes a first water inlet configured to fluidly couple a water source to the biology reservoir.

In some embodiments, the system includes a water reservoir thermally coupled to the first heat exchanger and the biology reservoir, wherein the water inlet fluidly couples the water reservoir to the biology reservoir.

In some embodiments, the liquid reservoir is fluidly coupled to the biology reservoir and configured to return liquid components to the biology reservoir.

In some embodiments, the system includes a second heat exchanger thermally coupled to the liquid reservoir.

In some embodiments, the system includes an air purification system operably coupled to the interior portion of the housing.

In some embodiments, the system includes an automated process controller configured to execute instructions for processing organic material.

In some embodiments, the system includes a first flow control device operably coupled between the biology reservoir and the dewatering device, wherein the first flow control device is in communication with the automated process controller and configured via the automated process controller to adjust a flow of a digested biomass from the biology reservoir to the dewatering device.

In some embodiments, a first temperature sensor configured to measure a temperature of the biology reservoir and in communication with the automated process controller. In some embodiments, the first heat exchanger is in communication with the automated process controller and configured to maintain the temperature of the biology reservoir in a range of about 77° F. to about 105° F.

In some embodiments, a first temperature sensor configured to measure a temperature of the biology reservoir and in communication with the automated process controller. In some embodiments, the first heat exchanger is in communication with the automated process controller and configured to maintain the temperature of the biology reservoir in a range of about 120° F. to about 135° F.

In some embodiments, a second temperature sensor configured to measure a temperature of the liquid reservoir and in communication with the automated process controller. In some embodiments, the second heat exchanger is in communication with the automated process controller and configured to maintain the temperature of the liquid reservoir at no more than about 70° F.

In some embodiments, the system includes a second flow control device operably coupled between the water source and the biology reservoir, wherein the second flow control device is in communication with the automated process controller and configured via the automated process controller to adjust a flow of water from the water source to the biology reservoir.

In some embodiments, the system includes third flow control device operably coupled between the liquid reservoir and the biology reservoir, wherein the second flow control device is in communication with the automated process controller and configured via the automated process controller to adjust a flow of liquid components from the liquid reservoir to the biology reservoir.

Some embodiments disclosed herein include a non-transitory computer-readable medium having instruction stored thereon for execution by a processor to provide a method for processing organic material, the method comprising: forming a slurry from components comprising water and organic material; combining the slurry with mesophilic microorganisms to form a biomass; anaerobically digesting the organic material in the biomass; and at least partially separating liquid components from the digested biomass. In some embodiments, no more than about 0.02 m$^3$ of methane per kilogram of organic material is produced during said method.

DETAILED DESCRIPTION

Figure 1:
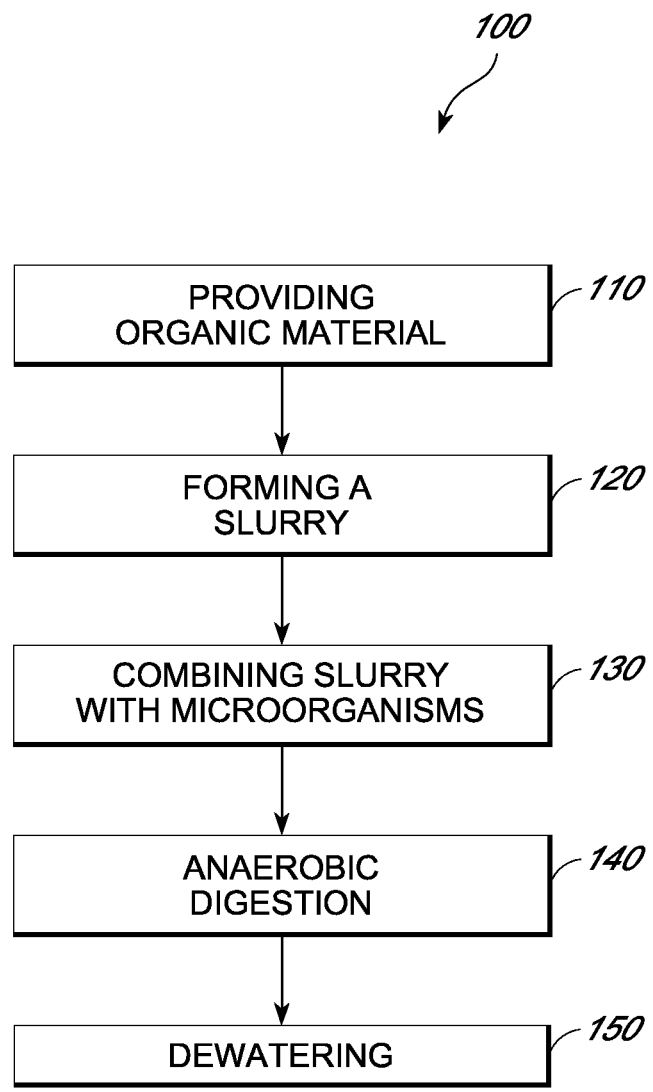
FIG. 1 is a flow diagram representing one example of method 100 for processing organic materials within the scope of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein are systems and methods for processing organic materials. The process may, for example, yield nutrient-rich materials that may have various agricultural uses. The method can include, in some embodiments, forming a slurry from components comprising liquid and organic material; combining the slurry with microorganisms to form a biomass; anaerobically digesting the organic material in the biomass; and at least partially separating liquid components from the digested biomass. In some embodiments, no more than about 0.02 m$^3$ (about 20 L) of methane are produced from the anaerobic digestion. Also disclosed are systems for processing organic materials. The systems may, in some embodiments, be configured to perform the method of processing organic materials.

FIG. 1 is a flow diagram representing one example of method 100 for processing organic materials within the scope of the present application. As illustrated in FIG. 1 method 100 may include one or more functions, operations, or actions as illustrated by one or more operations 110-150. Operations 110-150 may include "Providing Organic Material" operation 110, "Forming a Slurry" operation 120, "Combining Slurry with Microorganisms" operation 130, "Anaerobic Digestion" operation 140, and/or "Dewatering" operation 150.

In FIG. 1, operations 110-150 are illustrated as being performed sequentially, with operation 110 first and operation 150 last. It will be appreciated however that these operations may be re-ordered as convenient to suit particular embodiments, and that these operations or portions thereof may be performed concurrently in some embodiments.

Method 100 may begin at operation 110, "Providing Organic Material." In operation 110, organic material is provided for processing. The organic material is not particularly limited, and may be any organic material that is suitable for anaerobic digestion. Non-limiting examples of organic material that may be provided in operation 110 include: raw sewage, animal waste (e.g., manure), soluble solid wastes (e.g., cellulose-based paper products, such as cardboard), food waste, and the like. In some embodiments, the organic material is food waste. The food waste can be, for example, pre- or post-consumer food waste. Some examples of food waste include, but are not limited to, dairy (e.g., milk, cheese, etc.), meat (e.g., poultry, beef, fish, pork, etc.), grains (e.g., bread, crackers, pasta), fruits, and vegetables. As one example, the food waste may be unsold or expired food from a food retailer. As another example, food waste may be uneaten food or scraps from a restaurant.

Operation 110 may be followed by operation 120, "Forming a slurry." In operation 120, the organic material can be formed into a slurry. In some embodiments, the organic material may be reduced to particulate (e.g., comminution). Any suitable method for comminuting the organic materials can be used. For example, the organic waste may be subjected to grinding, cutting, crushing, milling, macerating, hydro-pulping, and the like. The size of the particulate formed from the organic material may vary and may be selected, in part, upon the conditions for anaerobic digestion. The particulate may have an average size of, for example, no more than about 10 cm; no more than about 8 cm; no more than about 5 cm; no more than about 2 cm; or no more than about 1 cm. The particulate may have an average size of, for example, at least about 500 μm; at least about 1 mm; at least about 2 mm; or at least about 5 mm. In some embodiments, particulate has an average size of about 1 mm to about 10 cm. Non-limiting examples for the average particle size include about 2 mm, about 4 mm, about 6 mm, about 8 mm, about 1 cm, or about 2 cm.

The organic material may, in some embodiments, be combined with a liquid to form a slurry. The organic material may be combined with a liquid before, during, and/or after the organic material is comminuted. The liquid can be, for example, water, leachate, or combinations thereof. The water may be, for example, potable water from a municipal water source or a well. As used herein, "leachate" includes liquid components isolated from an anaerobic digestion of organic materials (e.g., liquid components obtained from dewatering operation 150 in FIG. 1, which is discussed further below). The leachate may, in some embodiments, be unpurified leachate that has not been subjected to purification (e.g., the leachate has not been purified after being obtained from dewatering operation 150 in FIG. 1). In some embodiments, the liquid is water. In some embodiments, the liquid is a mixture including water and leachate.

The relative amount of liquid combined with the organic material can be selected to vary the characteristics of the slurry. The relative amount is not particularly limited and may vary depending upon various factors, such as the type of organic material and the anaerobic digestion conditions. The amount of organic material in the slurry may be, for example, at least about 40% (w/w); at least about 50% (w/w); at least about 60% (w/w); at least about 75% (w/w); at least about 90% (w/w); or at least about 95% (w/w). The amount of organic material in the slurry may be, for example, no more than about 100% (w/w); no more than about 95% (w/w); no more than about 90% (w/w); no more than about 75% (w/w); no more than about 60%; no more than about 50%; or no more than about 45%. In some embodiments, the amount of organic material in the slurry is from about 40% to about 100%. Non-limiting examples for the amount of organic material in the slurry include about 50%, about 67%, about 75%, about 80%, about 83%, or about 86%. In some embodiments, the balance of the slurry is the liquid combined with the organic material.

As noted above, the liquid may include a mixture of leachate and water. The relative amount of leachate and water added to the slurry is not limited. The relative amount of leachate to water can be, for example, no more than about 100% (w/w); no more than about 50% (w/w); no more than about 35% (w/w); or no more than about 20% (w/w). In some embodiments, no leachate is combined with the organic material.

In some embodiments, the amount of leachate combined with the organic material can be determined based on the nutrient content in the leachate. For example, the leachate may be combined with the organic material if the nitrogen content in the leachate is below a pre-determined threshold; however, no leachate may be combined with the organic material if the nitrogen content is above the pre-determined threshold. The threshold can be, for example, in the range of about 0.05% to about 3% nitrogen. Some non-limiting examples for the threshold include about 0.1%, about 0.2%, about 0.3%, about 0.4%, about 0.5%, about 1%, about 1.5%, about 2%, about 2.5%, or about 3% nitrogen. In some embodiments, the amount of leachate combined with the organic material may be inversely proportional to the amount nitrogen in the leachate. For example, a higher volume of leachate may be combined with the organic material when the nitrogen content is less than 0.1% compared to when the leachate has a nitrogen content in the range of 0.1% to 0.2%.

Combining liquid with the organic material is optional in operation 120. For example, the organic material may be comminuted to form a slurry without adding additional liquids. Thus, in some embodiments, the amount of organic material in the slurry can be 100%.

Operation 120 may be followed by operation 130, "Combining Slurry with Microorganisms." In operation 130, the slurry is combined with microorganisms that are suitable for performing anaerobic digestion to obtain a biomass. The type of microorganisms is not particularly limited, and numerous seeds are known in the art for anaerobic digestion. For example, a mesophilic seed was provided to the inventors by Penford Food Ingredients Co. (Richland, Wash.). In some embodiments, the microorganisms include bacteria. The bacteria may include, for example, hydrolytic bacteria, acetogenic bacteria, and acidogenic bacteria. In some embodiments, the microorganisms are mesophilic. In some embodiments, the microorganisms are thermophilic.

The microorganisms may, in some embodiments, be present in an at least partially digested biomass. The microorganisms may be suspended within the biomass. Thus, for example, the microorganisms may be combined with the slurry by combining an at least partially digested biomass with the slurry. The biomass and slurry may be mixed to suspend (or disperse) the microorganisms in the slurry.

In some embodiments, the microorganisms are carried by a solid support, such as, for example, rough stones, slats, plastic media, microcarriers, media particles, a biotower, a rotating biological contactor, and the like. Combining the slurry with the microorganisms may include, for example, contacting the slurry with a solid support including the microorganisms.

As will be appreciated by the skilled artisan, guided by the teachings of the present application, the order of operations 120 and 130 can be interchangeable, and may occur at about the same time or at different times. For example, the microorganisms may be first combined with the organic material and subsequently comminuted to obtain a slurry. As another example, the organic material can be comminuted and subsequently combined with a liquid and microorganisms at about the same time.

Operation 130 may be followed by operation 140, "Anaerobic Digestion." In operation 140, the biomass obtained in operation 130 is maintained at conditions for anaerobic digestion to occur. The particular conditions may vary depending on various factors, including the type of microorganisms, the organic material, etc. The anaerobic digestion may, in some embodiments, produce low amounts of methane. For example, in contrast to anaerobic digestion processes intended to improve methane production, operation 130 may include maintaining conditions that limit methane production (e.g., limit production of methane by methanogenic bacteria).

The biomass may, for example, be maintained at a pH that is effective for the microorganisms to anaerobically digest the organic materials. In some embodiments, the biomass is maintained at a pH that is effective to limit methane production. The pH of the biomass may, in some embodiments, be maintained within a range of about 3.5 to about 8. The biomass may be maintained at a pH of, for example, at least about 3.5; at least about 4; at least about 5; at least about 6; at least about 7; or at least about 7.5. The biomass may be maintained at a pH of, for example, no more than about 8, no more than about 7, no more than about 6; no more than about 5; or no more than about 4. In some embodiments, the pH is maintained within a range of about 3.5 to 5.5. In some embodiments, the pH is maintained within a range of about 5.5 to 7.

The pH can be maintained, in some embodiments, by measuring the pH at appropriate time intervals during anaerobic digestion and adding a pH modifying agent, if necessary, to adjust the pH. Non-limiting examples of pH modifying agents include carboxylic, phosphoric and sulfonic acids, acid salts (e.g., monosodium citrate, disodium citrate, monosodium malate, etc.), alkali metal hydroxides such as sodium hydroxide, calcium hydroxide, potassium hydroxide, carbonates (e.g., sodium carbonate, bicarbonates, sesquicarbonates), borates, silicates, phosphates (e.g., monosodium phosphate, trisodium phosphate, pyrophosphate salts, etc.), imidazole and the like.

The temperature of the biomass may, in some embodiments, be maintained at a temperature that is effective for the microorganisms to anaerobically digest the organic materials. In some embodiments, the biomass is maintained at a temperature in a range of about 77° F. to about 105° F. during the anaerobic digestion. For example, the biomass may include mesophilic microorganisms that exhibit increased digestion at about 77° F. to about 105° F. In some embodiments, the biomass is maintained at a temperature in a range of about 90° F. to about 98° F. during the anaerobic digestion. In some embodiments, the biomass is maintained at a temperature in a range of about 120° F. to about 135° F. during the anaerobic digestion. For example, the biomass may include thermophilic microorganisms that exhibit increased digestion at about 120° F. to about 135° F.

The relative amount of organic material to liquids may, in some embodiments, be maintained within a range that is effective for the microorganisms to anaerobically digest the organic materials. The relative amount of organic material to liquids may, for example, be maintained by forming the appropriate slurry mixture of organic materials and liquid as discussed above with respect to operation 120. For example, no liquids may be removed from the biomass during anaerobic digestion, and therefore the relative amount is maintained at the initial ratio provided in the slurry at operation 120. In some embodiments, leachate (which includes at least a portion of the liquids in the biomass) is removed from the biomass during the anaerobic digestion. The leachate may be removed periodically (e.g., daily) or continuously. Thus, in some embodiments, additional liquid may be combined with the biomass to maintain the relative amount of organic material to liquid within a range. In some embodiments, additional liquid is combined with the biomass to maintain the relative amount of organic material to liquid to be about the same as the slurry initially combined with the microorganisms at operation 130.

The amount of organic material in the biomass may be maintained during anaerobic digestion at, for example, at least about 40% (w/w); at least about 50% (w/w); at least about 60% (w/w); at least about 75% (w/w); at least about 90% (w/w); or at least about 95% (w/w). The amount of organic material in the biomass may be maintained during anaerobic digestion at, for example, no more than about 100% (w/w); no more than about 95% (w/w); no more than about 90% (w/w); no more than about 75% (w/w); no more than about 60%; no more than about 50% (w/w); or no more than about 45% (w/w). In some embodiments, the amount of organic material in the biomass may be maintained during anaerobic digestion at about 40% to about 100% (w/w). Non-limiting examples for the amount of organic material in the biomass that may be maintained during anaerobic digestion include about 50%, about 67%, about 75%, about 80%, about 83%, or about 86%. In some embodiments, the balance of the biomass is the liquid and microorganisms.

The average time period for anaerobically digesting the organic materials may also vary. In some embodiments, the average time period for anaerobically digesting the organic materials can be in the range of about 1 day to about 14 days. For example, the average time period for anaerobically digesting the organic materials can be about 1 day, about 2 days, about 3 days, about 4 days, about 5 days, about 6 days, about 7 days, about 8 days, about 9 days, about 10 days, about 11 days, about 12 days, about 13 days, about 14 days, or any range including any two of these values.

The biomass may, in some embodiments, be mixed during the anaerobic digestion. For example, the biomass can be mixed rotating one or more blades to stir the biomass. As another example, the biomass can be mixed by recirculating the biomass within a reservoir, such as by pumping biomass from a lower portion of a reservoir to an upper portion of the reservoir. The mixing may be continuous or periodic. In some embodiments, the mixing can be periodic at predetermined intervals (e.g., about every ten minutes).

In some embodiments, additional slurry may be added during the anaerobic digestion. For example, organic material may be provided periodically (e.g., daily) and added to the biomass during the anaerobic digestion according to operations 110-130. As one example, the anaerobic digestion may begin with an amount of organic material on a first day, and about the same amount of organic material is added to the biomass during anaerobic digestion each day until day seven. The anaerobic digestion may then be discontinued (or limited) for all or a portion of the organic material (e.g., by cooling the material to a temperature that limits digestion, such as in embodiments for operation 150 disclosed below). The present application is not limited to any particular rate of adding additional slurries to the anaerobic digestion.

The amount of methane produced during the anaerobic digestion may be low relative to conventional methods. For example, the amount of methane yielded may be less than those produced by the processes described in U.S. Pat. No. 6,846,343, the contents of which are hereby incorporated by reference in their entirety. In some embodiments, no more than about 0.02 m$^3$ of methane per kilogram of organic material is produced by the anaerobic digestion in operation 140. In some embodiments, no more than about 0.01 m$^3$ of methane per kilogram of organic material is produced by the anaerobic digestion in operation 140. In some embodiments, no more than about 0.005 m$^3$ of methane per kilogram of organic material is produced by the anaerobic digestion in operation 140. In some embodiments, no more than about 0.0001 m$^3$ of methane per kilogram of organic material is produced by the anaerobic digestion in operation 140. In some embodiments, no more than about 0.02 m$^3$ of methane per kilogram of organic material is produced during the method. In some embodiments, no more than about 0.01 m$^3$ of methane per kilogram of organic material is produced during the method. In some embodiments, no more than about 0.005 m$^3$ of methane per kilogram of organic material is produced during the method. In some embodiments, no more than about 0.001 m$^3$ of methane per kilogram of organic material is produced during the method.

The present application appreciates that exposing the microorganisms to at least small amounts of oxygen may, in some embodiments, limit methane production during anaerobic digestion. Thus, as used herein, the term "anaerobic digestion" is understood to include the breakdown of organic material with limited amounts of oxygen (as well as the absence of oxygen). For example, anaerobic digestion can occur when the oxygen content is sufficiently low that microorganisms primarily (or substantially entirely) metabolize organic materials by fermentation. In some embodiments, the microorganisms are exposed to an amount of oxygen that is effective to reduce methane production. The volume percentage of oxygen gas dissolved in solution in the biomass relative to a total volume of gas dissolved in solution in the biomass may, for example, be at least about 2%; at least about 3%; at least about 4%; at least about 5%; or at least about 8%. The volume percentage of oxygen gas dissolved in solution in the biomass relative to a total volume of gas dissolved in solution in the biomass may, for example, be no more than about 20%; no more than about 15%; no more than about 10%; no more than about 8%; no more than about 5%; or no more than about 4%. In some embodiments, the volume percentage of oxygen gas dissolved in solution in the biomass relative to a total volume of gas dissolved in solution in the biomass is about 2% to about 21%. In some embodiments, the volume percentage of oxygen gas dissolved in solution in the biomass relative to a total volume of gas dissolved in solution in the biomass is about 2% to about 8%.

Operation 140 may be followed by operation 150, "Dewatering." In operation 150, leachate is separated from the digested biomass obtained in operation 140. Numerous methods of dewatering are known in the art and are within the scope of the present application. Non-limiting examples of the method for dewatering the biomass include filtering, centrifuge, sedimentation, screw press, belt-filter press, and the like.

The dewatering may, in some embodiments, be performed continuously or periodically during anaerobic digestion. For example, the biomass may be filtered through a screen periodically (e.g., at least daily) to separate at least a portion of the leachate from the biomass. As another example, the biomass may continuously contact a screen configured to slowly separate water from the biomass (e.g., a screen with a sufficiently small size). As discussed above, in some embodiments, water may be added to the biomass during or after dewatering to maintain the relative amount of organic material to liquid.

In some embodiments, the leachate removed during dewatering may be received in a liquid reservoir for storing the leachate. The leachate may be stored, for example, in the liquid reservoir at a temperature below about 70° F. In some embodiments, at least a portion of the leachate is recirculated into to a biomass for further anaerobic digestion. For example, as discussed above, a portion of the leachate in the liquid reservoir may be combined with the organic material when forming the slurry at operation 120. As another example, the leachate may be directly added to the biomass during anaerobic digestion. As discussed above, in some embodiments, the amount of recirculated leachate can be determined, at least in part, by the nutrient content of the leachate (e.g., nitrogen content).

The leachate yielded during dewatering may, for example, be a nutrient-rich liquid that is suitable for further processing into fertilizer. The amount of nitrogen in the leachate may be, for example, at least about 0.1%; at least about 0.2%; at least about 0.3%; at least about 0.4%; at least about 0.5%; at least about 0.6%; at least about 0.8%; at least about 1%; at least about 1.5%; at least about 2%; at least about 2.5%; or at least about 3%. In some embodiments, the amount of nitrogen in the leachate can be at least about 0.1%. In some embodiments, the amount of nitrogen in the leachate can be at least about 0.5%. In some embodiments, the amount of nitrogen in the leachate can be at least about 1%.

The solids remaining after dewatering may be maintained under anaerobic digestion conditions (e.g., recirculate to a reservoir where anaerobic digestion conditions are maintained), or can be received in a solids reservoir. The destination of the solids may, in some embodiments, depend on the frequency of dewatering and the targeted average time period for anaerobic digestion. Solids may, for example, be received in the solids reservoir when a desired average time period for anaerobic digestion is achieved (e.g., the solids have been anaerobically digested for 1 to 14 days, or any time period disclosed above with respect to embodiments of operation 140). In some embodiments, the dewatering process may be different depending upon the destination of the solids after dewatering. For example, the biomass may be filtered using a screen when it is desired to maintain the solids under anaerobic digestion, and the biomass may be subject to a screw press when the solids will be placed in the solids reservoir. The solids yielded during dewatering may, for example, be used as volume-reduced compostable solid that may be subsequently converted into soil amendment.

Although, preferably, most or substantially all of the leachate in the biomass may be separated from the biomass before solids are placed into the solids reservoir, it is appreciated that at least a portion of the leachate may remain in the solids that are placed in the solids reservoir after dewatering. In some embodiments, at least about 40% of the leachate is separated from the digested biomass before placing solids in the solids reservoir. In some embodiments, at least about 50% of the leachate is separated from the digested biomass before placing solids in the solids reservoir. In some embodiments, at least about 60% of the leachate is separated from the digested biomass before placing solids in the solids reservoir. In some embodiments, the solids reservoir is maintained at a temperature below about 70° F.

All or a portion of the biomass may be removed from anaerobic digestion to perform dewatering. For example, anaerobic digestion may occur in a reservoir and the entirety of the biomass may be removed from the reservoir when dewatering. In some embodiments, at least a portion of the biomass will remain for additional anaerobic digestion. The portion of remaining biomass may provide microorganisms for combining with a new slurry of organic material. Thus, for example, the remaining biomass can be combined with a slurry to perform embodiments of operation 130 for a new batch of organic material. In some embodiments, no more than about 90% of the biomass undergoing anaerobic digestion is removed during dewatering. In some embodiments, no more than about 80% of the biomass undergoing anaerobic digestion is removed during dewatering.

In some embodiments, the method is performed in a closed system. For example, the method is performed within a closed structure that limits or controls the exchange of materials with the structure. For example, the operations 110-150 may be performed within a housing having a finite number of inlets and outlet for the organic material, liquids, biogas, leachate, solids, etc. The structure may limit the release of volatile organic compounds, volatile fatty acids, and hydrogen sulfide, or prevent exposing the microorganisms to excess oxygen.

In some embodiments, the method may include filtering the biogas produced during anaerobic digestion. In some embodiments, volatile organic compounds, hydrogen sulfide, or volatile fatty acids are removed from the biogas. The volatile fatty acids can be, for example, acetic acid, butyric acid, or propionic acid. As one example, the anaerobic digestion may be performed in a closed system, where biogas is released through a carbon filter that absorbs volatile organic compounds, hydrogen sulfide, or volatile fatty acids in the biogas.

Figure 2:
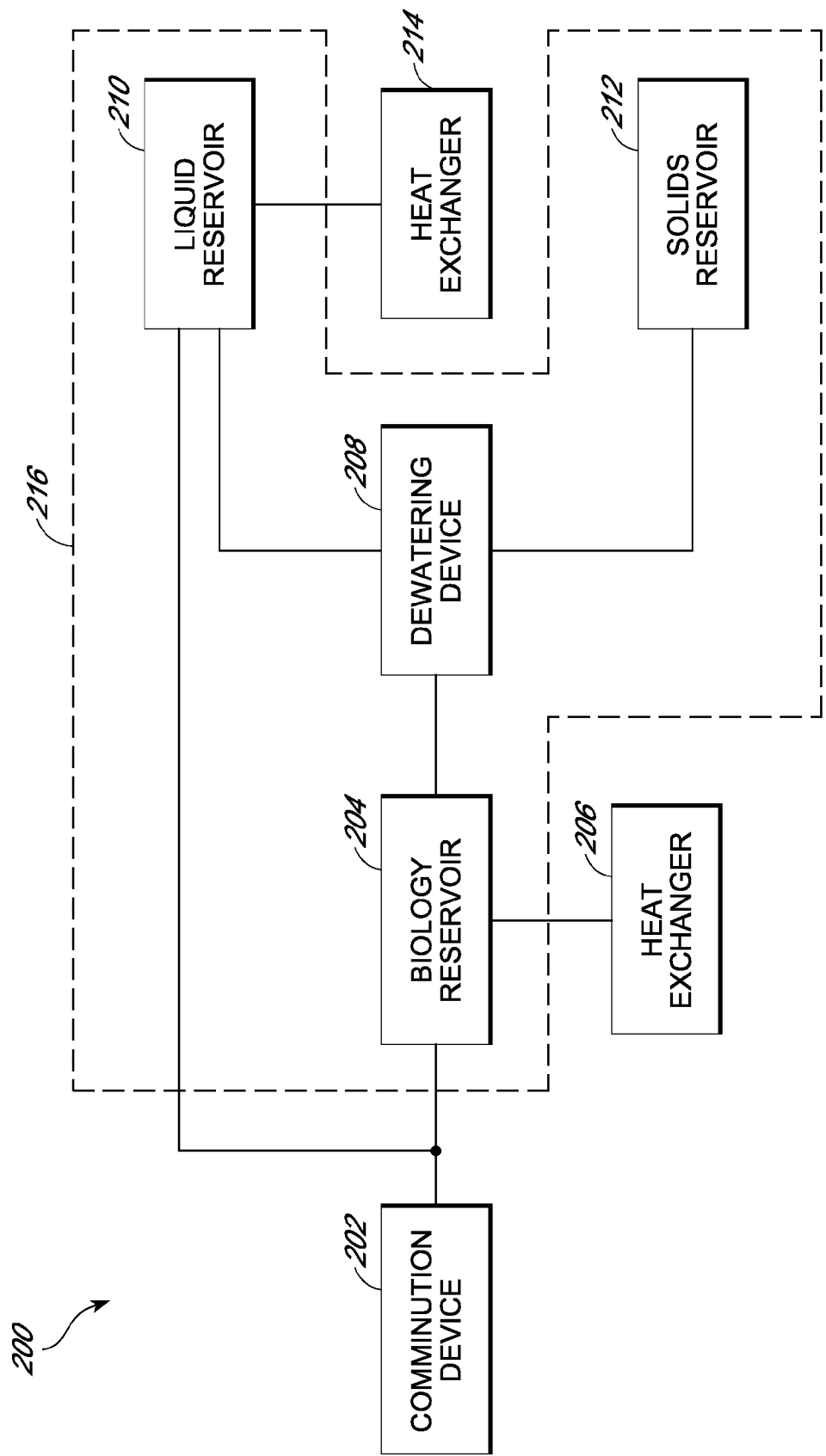
FIG. 2 is a block diagram illustrating one example of system 200 for processing organic materials within the scope of the present application.

FIG. 2 is a block diagram illustrating one example of system 200 for processing organic materials within the scope of the present application. System 200 may, in some embodiments, be configured to perform any of the methods disclosed above (e.g., embodiments of method 100 depicted in FIG. 1).

System 200 may include comminution device 202 which is fluidly coupled to biology reservoir 204. As used herein, "fluidly coupled" can include any connection through one or more conduits than allows the exchange of material between two components. Two components may be fluidly coupled when one or more intermediate components receive or process a fluid that is transferred between the two components. Comminution device 202 may be used, for example, to perform all or part of operation 120 depicted in FIG. 1. For example, organic material may be provided to the comminution device, which forms particulate and optionally combines a liquid with organic material. The comminution device may be, for example, a grinder, crusher, a mill, rotating blade, and the like.

Biology reservoir 204 may be used, for example, to perform anaerobic digestion in operation 140 as depicted in FIG. 1. Biology reservoir 204 may be a vessel or container that stores the biomass during anaerobic digestion. In some embodiments, biology reservoir 204 includes a mixer (not shown) for mixing biomass in biology reservoir 204. Examples of a mixer include, but are not limited to, one or more rotatable blades, one or more pumps for circulating biomass, and the like. Biology reservoir 204 may be thermally coupled to heat exchanger 206 to maintain the biology reservoir at an appropriate temperature for anaerobic digestion. For example heat exchanger 206 may maintain anaerobic digester 204 at any of the temperature ranges described above with respect to the method of process organic materials. Heat exchanger 206 may include a heating unit and/or a cooling unit as appropriate to maintain the temperature. In some embodiments, heat exchanger 206 is thermally coupled to biology reservoir 204 by circulating a fluid (e.g., water) between the two components.

Dewatering device 208 is fluidly coupled to biology reservoir 204 and configured to receive biomass from biology reservoir 204. Dewatering device 208 may be, for example, one or more of a filter, a centrifuge, a screw press, a belt-filter press, and the like. In some embodiments, dewatering device 208 is configured to perform embodiments of operation 150 as depicted in FIG. 1. Dewatering device 208 is fluidly coupled to liquid reservoir 210 and configured to provide liquid components (e.g., leachate) to liquid reservoir 210. Dewatering device 208 is also fluidly coupled to solids reservoir 212 and configured to provide solids to the solids reservoir 212. As described above with respect to the method of processing organic material, dewatering device 208 may also be configured so that solids can be retained or recirculated to biology reservoir 204 (not shown).

Liquid reservoir 210 may be fluidly coupled to biology reservoir 204. In some embodiments, liquid reservoir 210 is configured to recirculate leachate to biology reservoir 204. Liquid reservoir 210 may also be thermally coupled to heat exchanger 214. Heat exchanger 214 may be configured, for example, to maintain the temperature of liquid reservoir 210 below about 70° F. In some embodiments, heat exchanger 214 is thermally coupled to solids reservoir 212 (not shown).

System 200 may include closed structure 216 that may include biology reservoir 204, dewatering device 208, liquid reservoir 210, and solids reservoir 212. Closed structure 216 may include a finite number of inlets and outlets for the organic material, liquids, biogas, leachate, solids, etc. Closed structure 216 may limit the release of volatile organic compounds or prevent exposing the microorganisms to excess oxygen. In some embodiments, closed structure 216 is coupled to an air purifier (not shown). The air purifier may be configured to remove volatile organic compounds, hydrogen sulfide, or volatile fatty acids from the biogas. In some embodiments, the air purifier includes a carbon filter.

Figure 3:
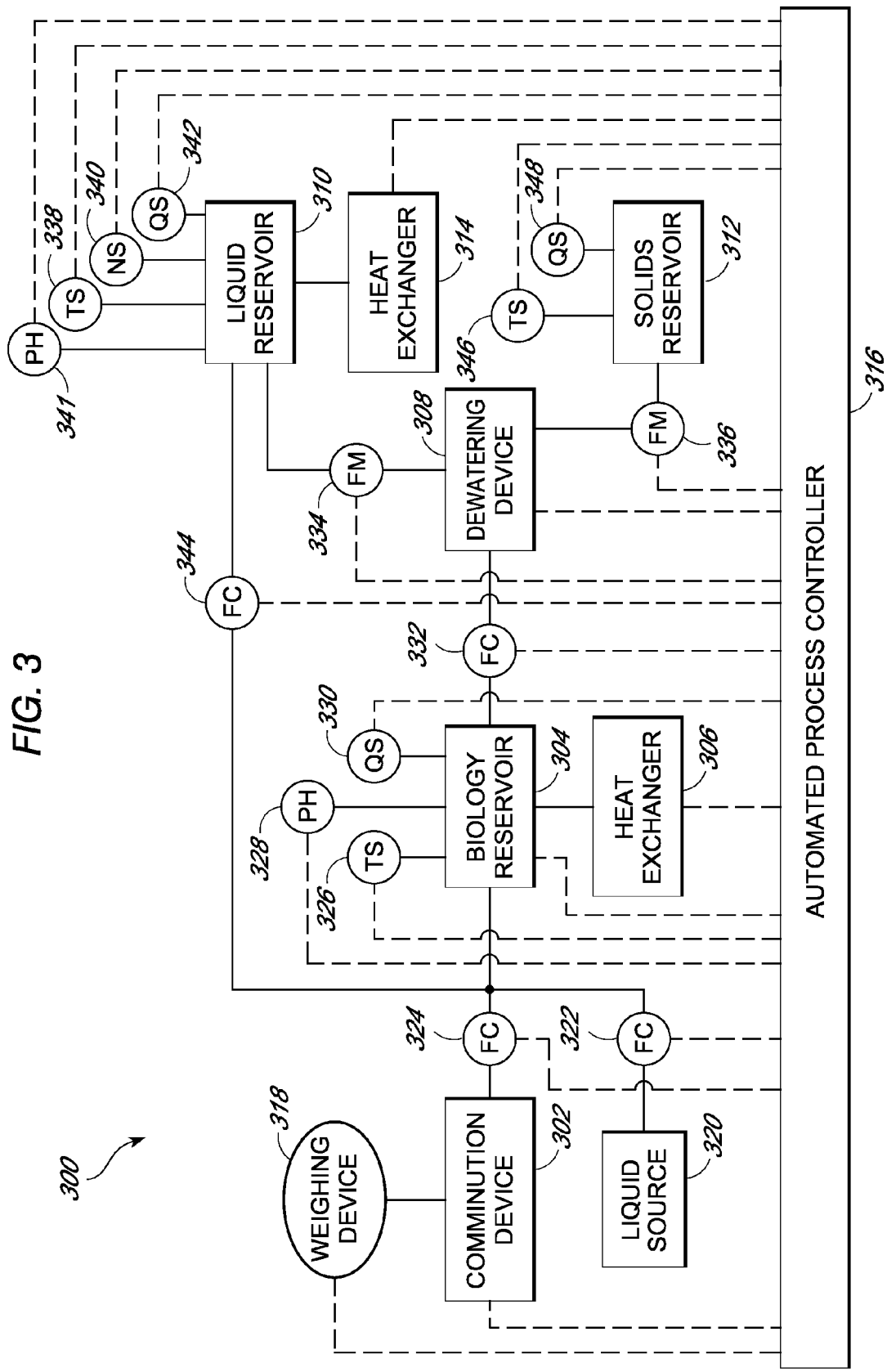
FIG. 3 is a block diagram illustrating one example of system 300 for processing organic materials within the scope of the present application.

FIG. 3 is a block diagram illustrating one example of system 300 for processing organic materials within the scope of the present application. System 300 may, in some embodiments, be configured to perform any of the methods disclosed herein (e.g., method 100 depicted in FIG. 1). Components 302-314 correspond to components 202-214 in system 200 depicted in FIG. 2.

System 300 includes automatic process controller 316 (hereinafter "controller") that is configured to execute instructions for processing organic material. In some embodiments, controller 316 is configured to execute instructions for processing organic material according to any of the methods disclosed in the present application (e.g., according to method 100 depicted in FIG. 1). Controller 316 may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The steps of the method described in connection with the embodiments disclosed herein may be embodied directly in controller 316, in a software module executed by controller 316, or in a combination of the two.

Controller 316 may be in communication with weighing device 318. As used herein, "in communication" can include any configuration that permits an at least one-directional exchange of signals (e.g., data) between two components. Two components may exchange signals, for example, via a wired connection, wirelessly, or through access to shared memory (e.g., flash memory). The exchange may occur through an intermediate device, such as a separate controller. Weighing device 318 may be configured to provide the amount of organic material provided for processing. Controller 316 may determine an appropriate amount of liquid to combine with organic material based, in part, on data received from weighing device 318 (e.g., as described above with respect to operation 120 in FIG. 1). Controller 316 may combine liquids from liquid source 320 (e.g., a municipal water line or water tank) which is fluidly coupled to biology reservoir 304. Flow control device 322 is in communication with controller 316 to adjust the amount of water added when forming a slurry. As used herein, a "flow control device" can include a pump or valve and optionally other components (e.g., volumetric sensors and weighing devices) that, when in communication with a controller, can control the quantity of material transferred between two components. Thus, in some embodiments, controller 316 may be configured to form a slurry according to any of the methods described above (e.g., control the slurry composition as described for operation 120 in FIG. 1).

Comminution device 302 may be in communication with controller 316. Controller 316 may, for example, receive signals from comminution device 302 indicating when the organic material has been comminuted. Flow control device 324 may be in communication with controller 316 and configured to adjust a flow of organic components from comminution device 302 to biology reservoir 304. For example, controller 316 may signal flow control device 324 to provide organic material to biology reservoir 304 when comminution device 302 has stopped operation.

Biology reservoir 304 can be in communication with controller 316. As an example, controller 316 may send signals to control operation of a mixer. Controller 316 may apply a pre-determined mixing protocol during anaerobic digestion and may adjust the mixing based on various events. For example, longer mixing may be applied when a new slurry is added to biology reservoir 304. As another example, mixing can be delayed when operating dewatering device 308.

Biology reservoir 304 may also include components for sensing various conditions during anaerobic digestion. Temperature sensor 326, pH sensor 328, and quantity sensor 330 (e.g., a weighing device or volumetric sensor) are configured to sense various properties in the biology reservoir. Each of these sensors may be in communication with controller 316, which may receive data concerning conditions in the biology reservoir and take appropriate steps to maintain conditions for anaerobic digestion. For example, controller 316 may receive temperature conditions from temperature sensor 326. Controller 316 may be in communication with heat exchanger 306 and adjust the operation parameters for heater exchanger 306 to adjust the temperature, if necessary. As another example, controller 316 may receive pH conditions from pH sensor 328. Controller 316 may be in communication with one or more flow control devices (not shown) for delivering pH modifying agents to adjust pH. As another example, quantity sensor 330 may provide the volume of material in biology reservoir 304 to controller 316. Controller 316 may be configured to add additional fluids (e.g., via one or more flow control devices) to maintain a desired amount of liquid relative to organic material in biology reservoir 304. In some embodiments, controller 316 is configured to maintain conditions within biology reservoir 304 according to any of the embodiments described with respect to the method of processing organic materials (e.g., embodiments relating to operation 140 in FIG. 1).

Flow control device 332 may be configured to adjust the flow of digested biomass from biology reservoir 304 to dewatering device 308. Flow control device 332 can be in communication with controller 316. Controller 316 may be configured to control the quantity and timing of providing biomass to dewatering device 308. Controller 316 may be configured provide biomass to dewatering device 308 according to any of the embodiments described with respect to the method of processing organic materials (e.g., embodiments relating to operation 140 and 150 in FIG. 1). Controller 316 may also be in communication with dewatering device 308 and control the operation of dewatering device 308.

Flow meter 334 is in communication with controller 316 and configured to provide flow measurements regarding the leachate provided from dewatering device 308 to liquid reservoir 310. Flow meter 336 is in communication with controller 316 and configured to provide flow measurements regarding the solids provided from dewatering device 308 to solids reservoir 312.

Liquid reservoir 310 may also include various components for sensing various conditions for the leachate. Temperature sensor 338, nutrient sensor 340, pH sensor 341, and quantity sensor 342 are configured to sense various characteristics of liquids reservoir 310. Nutrient sensor 340 may, for example, be an electrochemical sensor where electrical properties may be correlated with content of one or more nutrients. Each of these sensors may be in communication with controller 316, which can receive data regarding the leachate and make appropriate adjustments to the process. For example, if quantity sensor 342 indicates liquid reservoir 310 is full, the controller may stop providing biomass to dewatering device 308 using flow control device 332. As another example, controller 316 may receive temperature conditions from temperature sensor 338. Controller 316 may be in communication with heat exchanger 314 and adjust the operation parameters for heater exchanger 314 to adjust the temperature, if necessary.

As another example, controller 316 may be in communication with pH sensor 341 and can adjust an amount leachate that is recirculated to biology reservoir 304 based on the measured pH of the leachate.

Liquid reservoir 310 may be fluidly coupled to biology reservoir 304 so that leachate may be recirculated into biology reservoir 304. Flow control device 344 may be configured to adjust the flow of leachate from liquid reservoir 310 to biology reservoir. Flow control device 344 can be in communication with controller 316. In some embodiments, controller 316 may provide an amount of leachate to biology reservoir 304 based on the amount of organic material (e.g., received from weighing device 318) and nutrient content of the leachate (e.g., received from nutrient sensor 340). Controller 316 may, for example, be configured to provide an amount of leachate to biology reservoir 304 according to any of the embodiments for the method of processing organic materials described herein (e.g., embodiments relating to operation 120 in FIG. 1).

Solids reservoir 312 may also include various components for sensing various conditions in the solids. Temperature sensor 346 and quantity sensor 348 are configured to sense various characteristics of the solids reservoir. Each of these sensors may be in communication with controller 316, which can receive data regarding the solids and make appropriate adjustments to the process. For example, controller 316 may receive temperature conditions from temperature sensor 346. Heat exchanger 314 may be thermally coupled to solids reservoir 312 (not shown), sot that controller 316 may adjust the operation parameters for heater exchanger 314 to adjust the temperature of solids reservoir 312, if necessary. As another example, if quantity sensor 348 indicates solids reservoir 312 is full, the controller may stop providing biomass to dewatering device 308 using flow control device 332.

Controller 316 may optionally be coupled to a display screen (not shown) for displaying various characteristics of the process. Non-limiting examples for the display screen include a CRT monitor, an LCD screen, a touch-screen, an LED display, and the like. Controller 316 may display characteristics, such as temperature, pH, length of time for anaerobic digestion, quantity of biomass, quantity of leachate, quantity of solids, error messages, warning messages, and the like. Controller 316 may also be optionally coupled to an input device, such as a keyboard, mouse, touch-screen, etc. The input device may allow a user to adjust various settings or variables for controller 316 that modifies the how system 300 performs the method for processing organic material.

In some embodiments, controller 316 may be coupled to a communication device (not shown) for communicating with a remote system or user. The communication device is not particularly limited and can be, for example, a cellular modem, a land-line modem, a wifi device, and ethernet modem, and the like. Controller 316 may send data for system 300 via the communication device to a remote site or user. For example, the controller 316 may send error reports when one or more operating conditions are outside acceptable thresholds. In some embodiments, a user can remotely configure or control system 300 by sending signals to controller 316 via the communication device.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

EXAMPLES

Additional embodiments are disclosed in further detail in the following examples, which are not in any way intended to limit the scope of the claims.

Example 1

Food waste was collected from a local grocery store, consisting of produce, deli and meat scrap waste. Without sorting, the food waste was ground into a slurry containing an average particle size of less than about 0.5 cm and combined. On the first day (Day 1), in a closed system having 500 g of food waste, 660 g of mesophilic seed (Penford Food Ingredients, Richland, Wash.) and 500 g of deionized water were added and the slurry was well mixed. The biology reservoir was kept at 35 to 37° C. for 24 hours allowing the bacteria to incubate and decompose the slurry. On Day 2, 160 mL of leachate was dewatered through a screen press, 500 g of ground food was added and 160 mL of deionized water was also added. This same operation was performed on Day 3, Day 4, Day 5 and Day 6. On Day 7, 80% of the remaining contents of the slurry were dewatered.

The Total Kjeldahl Nitrogen ("TKN") test was determined using known methods (Hach Compoant, Product #TNT826) for each leachate sample to determine the total percent weight of nitrogen in the sample. The results are listed in TABLE 1.

TABLE 1

| Day # | N (% weight) |
|---|---|
| Day 2 | 0.75 |
| Day 3 | 0.97 |
| Day 4 | 0.89 |
| Day 5 | 0.90 |
| Day 6 | 1.00 |
| Day 7 | 0.92 |

The nitrogen content of the leachate was effectively being concentrated over the period from Day 2 through Day 6 and a maximum N concentration of 1.0% being indicated on Day 6.

A trace metal analysis of the leachate was performed by a third party chemical testing service and the results are provided in TABLE 2.

TABLE 2

| Element | PPM* |
|---|---|
| Potassium (K) | 2,800.00 |
| Calcium (Ca) | 1,500.00 |
| Sodium (Na) | 1,230.00 |
| Phosphorus (P) | 1,020.00 |
| Iron (Fe) | 724.00 |
| Sulfur (S) | 430.00 |
| Magnesium (Mg) | 260.00 |
| Silicon (Si) | 25.3 |
| Manganese (Mn) | 7.34 |
| Zinc (Zn) | 5.57 |
| Strontium (Sr) | 1.90 |
| Tin (Sn) | 0.80 |
| Molybdenum (Mo) | 0.35 |
| Chromium (Cr) | 0.34 |
| Copper (Cu) | 0.13 |
| Cobalt (Co) | 0.11 |
| Barium (Ba) | 0.04 |

*PPM (parts per million). Equivalent units are grams per milliliter (g/mL) and micrograms per gram (µg/g).

Example 2

The same procedure was employed as in Example 1, except for the difference of adding 700 g of water on Day 1, and 200 g of water at each point from Day 2 through Day 6. The TKN of each dewatered leachate sample on Days 2 through Day 6 were measured and the results are listed in TABLE 3.

TABLE 3

| Day # | N (% weight) |
|---|---|
| Day 2 | 0.16 |
| Day 3 | 0.37 |
| Day 4 | 0.40 |
| Day 5 | 0.75 |
| Day 6 | 0.42 |
| Day 7 | 0.35 |

The total nitrogen content of the leachate continued to increase each day until Day 5 in this instance, and the overall nitrogen concentrations measured were lower, presumably due to the diluting effect of the additional water utilized in the hydration model.

What is claimed is:

1. A system for processing organic materials comprising:
a comminution device fluidly coupled to a biology reservoir, the biology reservoir being maintained in an anaerobic environment and containing microorganisms suitable for performing anaerobic digestion of the organic materials;
a first heat exchanger thermally coupled to the biology reservoir;
a dewatering device fluidly coupled to, and downstream of, the biology reservoir, wherein the dewatering device is configured to at least partially separate liquid components from a composition received from the biology reservoir;
a solids reservoir fluidly coupled to the dewatering device and configured to receive solid components from the dewatering device;
a liquid reservoir fluidly coupled to the dewatering device and configured to receive liquid components from the dewatering device, wherein the liquid reservoir is fluidly coupled to the biology reservoir and configured to return liquid components to the biology reservoir;

a second heat exchanger thermally coupled to the liquid reservoir, configured to maintain the liquid reservoir at a temperature below the temperature of the biology reservoir; and a housing having a closed interior portion, wherein the closed interior portion comprises at least the biology reservoir, the solids reservoir and the liquid reservoir.

2. The system of claim 1, further comprising a weighing device configured to weigh an amount of organic materials provided to the biology reservoir.

3. The system of claim 1, further comprising a first water inlet configured to fluidly couple a water source to the biology reservoir.

4. The system of claim 3, further comprising a water reservoir thermally coupled to the first heat exchanger and the biology reservoir, wherein the water inlet fluidly couples the water reservoir to the biology reservoir.

5. The system of claim 1, wherein the liquid reservoir is fluidly coupled to the biology reservoir and configured to receive liquid components from the biology reservoir and return liquid components to the biology reservoir.

6. The system of claim 1, further comprising an air purification system operably coupled to the interior portion of the housing.

7. The system of claim 1, further comprising an automated process controller configured to execute instructions for processing organic material.

8. The system of claim 7, further comprising a first flow control device operably coupled between the biology reservoir and the dewatering device, wherein the first flow control device is in communication with the automated process controller and configured via the automated process controller to adjust a flow of a digested biomass from the biology reservoir to the dewatering device.

9. The system of claim 7, wherein:
a first temperature sensor configured to measure a temperature of the biology reservoir and in communication with the automated process controller; and
the first heat exchanger is in communication with the automated process controller and configured to maintain the temperature of the biology reservoir in a range of about 77° F. to about 105° F.

10. The system of claim 7, wherein:
a first temperature sensor configured to measure a temperature of the biology reservoir and in communication with the automated process controller; and
the first heat exchanger is in communication with the automated process controller and configured to maintain the temperature of the biology reservoir in a range of about 120° F. to about 135° F.

11. The system of claim 7, wherein:
a second temperature sensor configured to measure a temperature of the liquid reservoir and in communication with the automated process controller; and
the second heat exchanger is in communication with the automated process controller and configured to maintain the temperature of the liquid reservoir at no more than about 70° F.

12. The system of claim 7, further comprising a second flow control device operably coupled between the water source and the biology reservoir, wherein the second flow control device is in communication with the automated process controller and configured via the automated process controller to adjust a flow of a water from the water source to the biology reservoir.

13. The system of claim 7, further comprising a third flow control device operably coupled between the liquid reservoir and the biology reservoir, wherein the second flow control device is in communication with the automated process controller and configured via the automated process controller to adjust a flow of liquid components from the liquid reservoir to the biology reservoir.

14. The system of claim 1, wherein the second heat exchanger is thermally coupled to the solids reservoir.

* * * * *